United States Patent
Lee et al.

(10) Patent No.: US 7,986,879 B2
(45) Date of Patent: Jul. 26, 2011

(54) SYSTEM AND METHOD FOR POLLING IN ETHERNET PASSIVE OPTICAL NETWORK

(75) Inventors: Sang Ho Lee, Gyeonggi-do (KR); Min Young Chung, Seoul (KR); Tae-Jin Lee, Gyeonggi-do (KR); Hyun Seung Choo, Gyeonggi-do (KR)

(73) Assignee: Sungkyunkwan University Foundation For Corporate Collaboration, Suwon-si, Gyeonggi-do (KR)

( * ) Notice: Subject to any disclaimer, the term of this patent is extended or adjusted under 35 U.S.C. 154(b) by 755 days.

(21) Appl. No.: 12/034,568

(22) Filed: Feb. 20, 2008

(65) Prior Publication Data

US 2009/0190606 A1 Jul. 30, 2009

(30) Foreign Application Priority Data

Jan. 25, 2008 (KR) .................. 10-2008-0007927

(51) Int. Cl.
*H04B 10/20* (2006.01)
(52) U.S. Cl. ............................ 398/66; 398/69
(58) Field of Classification Search ............... 398/66.69
See application file for complete search history.

(56) References Cited

U.S. PATENT DOCUMENTS

2003/0152389 A1  8/2003 Sala et al.
2007/0133596 A1* 6/2007 Kim ........................ 370/465

FOREIGN PATENT DOCUMENTS

KR  10-2006-0080783 A  7/2006
KR  10-2007-0061235 A  6/2007
WO  WO2006106499  * 10/2006

OTHER PUBLICATIONS

Office Action for Korean counterpart application No: KR10-2008-0007927, dated May 6, 2009, 7 pages.
Office Action for Korean counterpart application No: KR10-2008-0007927, dated Oct. 13, 2009, 6 pages.

* cited by examiner

*Primary Examiner* — Leslie Pascal
(74) *Attorney, Agent, or Firm* — Blakely, Sokoloff, Taylor & Zafman LLP.

(57) ABSTRACT

Disclosed is a system and a method for polling in an Ethernet Passive Optical Network (EPON). The system includes: multiple Optical Network Units (ONUs) for sharing optical channels of the EPON with one another and transmitting traffic; and an Optical Line Terminal (OLT) for discriminating a plurality of ONUs gaining access to the EPON among the multiple ONUs and then collecting routing information on the plurality of ONUs gaining access to the EPON, and for classifying the plurality of ONUs gaining access to the EPON into two or more ONU groups according to the collected routing information and then carrying out forming a polling cycle and allocating bandwidth on each ONU group. Therefore, a transmission idle period in a traffic channel is not only minimized, but an availability ratio of traffic channels can also be maximized.

21 Claims, 5 Drawing Sheets

SYSTEM AND METHOD FOR POLLING IN ETHERNET PASSIVE OPTICAL NETWORK

CROSS-REFERENCE TO RELATED APPLICATIONS

The present patent application claims priority from Korean Patent Application No. 10-2008-0007927 filed on Jan. 25, 2008.

BACKGROUND OF THE INVENTION

1. Field of the Invention

The present invention relates to a system and a method for polling in an Ethernet Passive Optical Network (EPON), and more particularly to a system and a method for polling in an EPON, in which the maximization of an availability ratio of traffic channels results from an efficient utilization of resources, including traffic channels and time slots, used for traffic transmission in an EPON-based system.

2. Description of the Prior Art

An explosive increase of Internet users and the rise of applications requiring huge bandwidth cause a bottleneck situation between a large-capacity Local Area Network (LAN) and a backbone network. EPON technology is a representative one of solutions which can relieve the bottleneck situation occurring by a congestion of service requirements as above.

The EPON provides a high-quality access service through low-priced Ethernet and passive optical devices. The EPON is applicable and practicable to Wavelength-Division Multiplexing-Passive Optical Network (WDM-PON) technology, and is thus recognized as one of technologies which are optimal for a Fiber-To-The-Home (FTTH)-based access network structure henceforth.

Generally, an EPON in the form of a tree-structure topology, forming a point-to-multipoint optical network includes an Optical Line Terminal (OLT), a passive optical splitter/coupler, and an 'N' number of Optical Network Units (ONUs). Multiple ONUs share one optical channel with one another, and then performs traffic transmission. In the EPON technology, two wavelengths are used so as to provide a cost-efficient and effective data transmission service to subscriber network users located at a relatively short distance called the "last-mile", where one wavelength is used for downstream representing a direction from the OLT to the ONUs, and the other wavelength is employed for upstream expressing a direction opposite to downstream. Especially, during data upstream, the OLT uses a Time-Division Multiple Access (TDMA) scheme so as to avoid transmission collision, and then provides the multiple ONUs with bandwidth allocation service. In an EPON system, the OLT located in a central office manages a right to use an upstream channel, the distribution of time slots, and bandwidth allocation for the ONUs. It can be said that an efficient distribution and management of optical channel use time slots is an essential factor in determining the performance of the overall EPON system, and is thus linked directly with service quality for users.

In the EPON, two mechanisms are typically considered so as to efficiently accommodate bandwidth requirements. One scheme is polling scheduling for determining a time point and order required for bandwidth allocation. The other scheme is a Dynamic Bandwidth Allocation (DBA) for determining bandwidth to be allocated to each ONU based on request bandwidth by corresponding ONU. In the two aspects, research has been conducted on various bandwidth management methods. As representative research, Interleaved Polling with Adaptive Cycle Time (IPACT), Sliding Cycle Time (SLICT), Early Allocation (EA), etc., can be cited. They properly apply the polling scheduling to bandwidth allocation, thereby accepting bandwidth requirements. The existing studies on bandwidth allocation are based on three polling schedules, i.e., Poll and Stop Polling, Interleaving Polling, and Interleaved Polling with Stop.

The scheme of Interleaved Polling with Stop among them carries out computation on bandwidth allocation to all ONUs per polling cycle, and accordingly, can efficiently and adequately allocate bandwidth. Nevertheless, this scheme has the problem that optical channel idle time exists. Polling schemes carrying out various approaches for solving this problem have been proposed.

Also, the EA scheme is the most representative scheme among approaches for reducing an optical channel idle time, and raises an availability ratio of upstream channels. However, the EA scheme has problems in that it has significant channel idle time occurring in an environment where the amount of traffic is larger, and ultimately acts in the same manner as that of the Interleaved Polling with Stop. Accordingly, there has been a need for improving the problems.

The OLT uses a Multi-Point Control Protocol (MPCP) so as to allocate bandwidths to multiple ONUs connected thereto. The MPCP is a polling protocol for the permission and a report of traffic transmission, and is standardized by the IEEE Ethernet in the First Mile (EFM) Task Force. The MPCP includes two modes such as a general mode and an auto-discovery mode. The general mode includes a GATE message and a REPORT message, where the GATE message is used by the OLT so as to allocate bandwidths to the ONUs, and the REPORT message is used by each Optical Network Unit (ONU) in order to report its own buffer status to the OLT. The auto-discovery mode is used so as to check whether the ONUs are linked to one OLT. In the auto-discovery mode, the OLT and the ONUs collect information (e.g., a Round Trip Time (RTT), a Media Access Control (MAC) address, etc.) on the linked ONUs by using REGISTER, REGISTER_REQUEST, and REGISTER_ACK messages.

In the EPON, detecting a state of each ONU based on the MPCP, the OLT allocates bandwidths to the ONUs, and the multiple ONUs request the OLT to allocate bandwidth. An effective polling policy not only raises the utilization of optical channels corresponding to one of the biggest issues in EPON research, but also reduces the "last-mile" bottleneck by properly allocating bandwidth.

In the poll and stop polling scheme out of the above basic polling policies, an OLT sends a GATE message so as allocate bandwidth to one ONU, and then waits until data and a REPORT message are transmitted from the one ONU to it. The poll and stop polling scheme has an optical channel idle period having its length equal to the extent of that of RTT per GNU existing whenever the OLT allocates bandwidths to ONUs, and thus show the lowest network throughput among the three basic polling policies.

In order to reduce propagation delay caused by MPCP signaling, the Interleaved Polling scheme uses upstream and downstream in such a manner as to overlap each other. After an OLT sends a GATE message to an ONU_i, it sends another GATE message to an ONU_(i+1) before data and a REPORT message transmitted by the ONU_i arrive. Herein, upstream of the ONU_i and downstream of the ONU_(i+1) progress on one optical channel, for which two different wavelengths (e.g., 1550 nm for upstream, 1310 nm for downstream) in one optical line. The Interleaved Polling scheme can raise an availability ratio of optical channels, but determines bandwidth to be allocated based on REPORT information of one ONU, so that bandwidth cannot be optimally allocated in consideration of all ONUs.

So as to make up for disadvantages of the Interleaved Polling scheme, the Interleaved Polling with Stop scheme stops polling with respect to every cycle. In the Interleaved Polling with Stop, the OLT receives REPORT messages from all ONUs, and then computes bandwidths allocated to the ONUs with reference to request bandwidths required by the ONUs. Thereafter, the OLT sends a GATE massage to the relevant ONU in the order of arrival time of REPORT messages. However, in the Interleaved Polling with Stop scheme, after the OLT has received the REPORT messages from all the ONUs, computation time necessary to compute the allocated bandwidths and channel idle time approximating the RTT are generated every cycle.

So as to remove the disadvantages of the Interleaved Polling with Stop, the EA scheme has been suggested. In the EA scheme for reducing an idle of an optical cannel, an OLT determines an immediate allocation of bandwidth to a relevant ONU or a computation wait of bandwidth allocation based on an optional threshold value and request bandwidth reported by ONUs.

In the EA, the OLT predetermines a particular threshold value as a minimum guarantee bandwidth, when one ONU requires bandwidth smaller than the minimum guarantee bandwidth, does not wait until a computation time point necessary for bandwidth allocation, but immediately allocates bandwidth to the relevant ONU. When the OLT allocates bandwidth to the relevant ONU, it determines a transmission start time so that the relevant ONU can transmit upstream frames for computation time necessary to allocation bandwidth and channel idle time equivalent to RTT. The EA scheme has such an advantage that it can use a predetermined optical channel idle time. Nevertheless, when the level of traffic between nodes of the ONUs is high on the whole, the EA scheme does not immediately allocate bandwidth, and acts as in the Interleaved Polling with Stop scheme. Also, the EA scheme has excessive jitter and provides an unstable service, because order for bandwidth allocation (i.e., upstream permission) to the ONUs changes.

On this account, there has been a need for a scheme of implementing an EPON-base system in an even more stable manner, and simultaneously utilizing traffic channels in a much more efficient manner.

SUMMARY OF THE INVENTION

Accordingly, the present invention has been made to solve the above-stated problems occurring in the prior art, and it is an object of the present invention to provide a system and a method for polling in an EPON, in which the maximization of an availability ratio of traffic channels results from an efficient utilization of resources, including traffic channels and time slots, used for traffic transmission in an EPON-based system.

It is another object of the present invention to provide a system and a method for polling in an EPON, in which multiple ONUs gaining access to the EPON are classified into at least two ONU groups, and then, forming a polling cycle and allocating bandwidth are carried out independently and parallel on each ONU group.

It is still another object of the present invention to provide a system and a method for cross-executing at least two polling mechanisms, corresponding to traffic load in an EPON.

In accordance with a first aspect of the present invention for achieving the above objects, there is provided a system for polling in a EPON, the system including: multiple ONUs for sharing optical channels of the EPON with one another and transmitting traffic; and an OLT for discriminating a plurality of ONUs gaining access to the EPON among the multiple ONUs and then collecting routing information on the plurality of ONUs gaining access to the EPON, and for classifying the plurality of ONUs gaining access to the EPON into two or more ONU groups according to the collected routing information and then carrying out forming a polling cycle and allocating bandwidth on each ONU group.

Preferably, the OLT is based on a Multi-Point Control Protocol (MPCP).

Preferably, the OLT forms the two or more ONU groups through a result produced by determining the routing information based on the MPCP.

Preferably, the OLT re-discriminates a plurality of ONUs gaining access to the EPON among the multiple ONUs and then re-collects routing information on the plurality of ONUs gaining access to the EPON, and re-forms two or more ONU groups based on the re-collected routing information.

Preferably, the routing information includes: Round Trip Time (RTT) information; and a Media Access Control (MAC) address.

Preferably, the OLT: forms the first polling cycle, corresponding to the first ONU group among the two or more ONU groups, forms the second polling cycle, corresponding to the second ONU group among the two or more ONU groups, receives the REPORT messages representing buffer sizes from the ONUs in the first ONU group every first polling cycle, and forms a GATE messages regarding the allocation of bandwidth corresponding to the buffer size to deliver the formed GATE messages to ONUs in the first ONU group; and receives REPORT messages representing a buffer size from ONUs in the second ONU group every second polling cycle, and forms GATE messages regarding the allocation of bandwidth corresponding to the buffer size to deliver the formed GATE messages to ONUs in the second ONU group.

Preferably, the OLT: forms the first polling cycle regarding the first ONU group with the Interleaved Polling with Stop scheme, and then allocates bandwidth with GATE messages; and forms the second polling cycle regarding the second ONU group in the Interleaved Polling with Stop scheme, and then allocates bandwidth with GATE messages.

Preferably, the OLT allows ONUs in the second ONU group to transmit traffic while forming the GATE messages for the first ONU group, the OLT allows ONUs in the first ONU group to transmit traffic while forming the GATE messages for the second ONU group.

Preferably, the traffic corresponds to upstream traffic transmitted by the plurality of ONUs gaining access to the EPON.

In accordance with a second aspect of the present invention for achieving the above objects, there is provided a method for polling in an EPON, the method including the steps of: (A) discriminating a plurality of ONUs gaining access to the EPON among multiple ONUs for sharing optical channels of the EPON with one another and transmitting traffic; (B) collecting routing information from the plurality of ONUs gaining access to the EPON (C) classifying the plurality of ONUs gaining access to the EPON into two or more ONU groups; and (D) carrying out forming a polling cycle and allocating bandwidth on each ONU group.

Preferably, the method further includes a step of (E) re-discriminating a plurality of ONUs gaining access to the EPON among the multiple ONUs to re-collect routing information on the plurality of ONUs gaining access to the EPON, re-forming two or more ONU groups based on the re-collected routing information, and then carrying out forming a polling cycle and allocating bandwidth on each ONU group.

Preferably, step (D) includes the sub-steps of: (D-1) forming a first polling cycle corresponding to a first ONU group among the two or more ONU groups, and forming a second polling cycle corresponding to a second ONU group among the two or more ONU groups; (D-2) receiving REPORT messages representing a buffer size from the ONUs in the first ONU group every first polling cycle; (D-3) forming GATE messages regarding the allocation of bandwidth corresponding to the REPORT messages, and then delivering the formed the GATE messages to the ONUs in the first GNU group; (D-4) receiving REPORT messages representing a buffer size from the ONUs in the second ONU group every second polling cycle; and (D-5) forming GATE messages regarding the allocation of bandwidth corresponding to the REPORT messages, and then delivering the formed GATE messages to the ONUs in the second ONU group.

Preferably, step (D) further includes a step of allowing the ONUs in the second ONU group to transmit traffic while forming GATE messages for the first ONU group, and allowing the ONUs in the first ONU group to transmit traffic while forming GATE messages for the second ONU group.

In accordance with a third aspect of the present invention for achieving the above objects, there is provided a system for polling in an EPON, the system including: multiple ONUs for sharing optical channels of the EPON with one another and transmitting traffic and an OLT for discriminating a plurality of ONUs gaining access to the EPON among the multiple ONUs and then collecting routing information on the plurality of ONUs gaining access to the EPON, and for executing, depending on traffic load of the EPON based on the collected routing information, a first polling mechanism for allocating bandwidth to each ONU included in the plurality of ONUs gaining access to the EPON, or a second polling mechanism for carrying out forming a polling cycle and allocating bandwidth on each ONU group after classifying the plurality of ONUs gaining access to the EPON into two or more ONU groups according to the collected routing information.

Preferably, the OLT is based on a Multi-Point Control Protocol (MPCP).

Preferably, the OLT determines traffic load of the EPON based on a polling switching threshold value set by $$S_{tran} = \frac{T_{idle} \times R_U}{8 \text{ bits}},$$

and then cross-executes the first polling mechanism and the second polling mechanism, wherein $S_{tran}$ represents a polling switching threshold value, $T_{idle}$ represents idle time of an optical channel (computation time necessary to allocate bandwidth to a plurality of ONUs gaining access to the EPON+an RTT), and $R_U$ represents an upstream channel speed in bits/sec.

Preferably, the OLT executes the first polling mechanism to allocate bandwidth to the plurality of ONUs gaining access to the EPON, and then switches the first poling mechanism to the second polling mechanism depending on whether the bandwidth allocation executed by the first polling mechanism satisfies a condition defined by $$\sum_{i \in A} R'_i \geq S_{tran}, \sum_{j \in B} R'_j \geq S_{tran}, \sum_{i \in A} R_i \geq S_{tran}, \text{ and } \sum_{j \in B} R_j \geq S_{tran},$$

wherein $R_i$ represents requested bandwidth of ONU_i in the first ONU group, $R'_i$ represents requested bandwidth of ONU_i in the first ONU group in a previous polling cycle, $R_j$ represents requested bandwidth of ONU_i in the second ONU group, $R'_j$ represents requested bandwidth of ONU_i in the second ONU group in a previous polling cycle, A represents the first ONU group, and B represents the second ONU group.

Preferably, the OLT executes the second polling mechanism to form a polling cycle and allocate bandwidth on each group, and then switches the second polling mechanism to the first polling mechanism depending on whether the formation of the polling cycle and the bandwidth allocation executed by the second polling mechanism satisfies a condition defined by $$\sum_{i \in A} R'_i < S_{tran}, \sum_{j \in B} R'_j < S_{tran}, \sum_{i \in A} R_i < S_{tran}, \text{ and } \sum_{j \in B} R_j < S_{tran},$$

wherein $R_i$ represents requested bandwidth of ONU_i in the first ONU group, $R'_i$ represents requested bandwidth of ONU_i in the first ONU group in a previous polling cycle, $R_j$ represents requested bandwidth of ONU_i in the second ONU group, $R'_j$ represents requested bandwidth of ONU_i in the second ONU group in a previous polling cycle, A represents the first ONU group, and B represents the second ONU group.

Preferably, the first polling mechanism corresponds to the Interleaved Polling scheme.

Preferably, the second polling mechanism is based on the Interleaved Polling with Stop scheme.

In accordance with a fourth aspect of the present invention for achieving the above objects, there is provided a method for polling in an EPON, the method including the steps of: (1) discriminating a plurality of ONUs gaining access to the EPON among multiple ONUs for sharing optical channels of the EPON with one another and transmitting traffic; (2) collecting routing information from the plurality of ONUs gaining access to the EPON (3) determining a traffic load of the EPON based on the routing information; and (4) executing, depending on a polling switching threshold value set for the determined traffic load of the EPON, the first polling mechanism for allocating bandwidth to each ONU included in the plurality of ONUs gaining access to the EPON, or the second polling mechanism for forming a polling cycle and allocating bandwidth on each ONU group after classifying the plurality of ONUs gaining access to the EPON into two or more ONU groups according to the collected routing information.

Preferably, the method further includes the steps of: (5) re-discriminating a plurality of ONUs gaining access to the EPON among the multiple ONUs, re-collecting routing information on the plurality of ONUs gaining access to the EPON, and re-determining traffic load of the EPON based on the re-collected routing information; and (6) cross-executing the first polling mechanism and the second polling mechanism depending on a polling switching threshold value set for the re-determined traffic load of the EPON.

Preferably, the first polling mechanism corresponds to the Interleaved Polling scheme.

More preferably, the second polling mechanism is based the Interleaved Polling with Stop scheme.

BRIEF DESCRIPTION OF THE DRAWINGS

The above and other exemplary features, aspects, and advantages of the present invention will be more apparent from the following detailed description taken in conjunction with the accompanying drawings, in which.

DETAILED DESCRIPTION OF THE EXEMPLARY EMBODIMENTS

Hereinafter, exemplary embodiments of the present invention will be described in detail with reference to the accompanying drawings. In the following description of the present invention, a detailed description of known functions and configurations incorporated herein will be omitted when it may make the subject matter of the present invention rather unclear.

Figure 1:
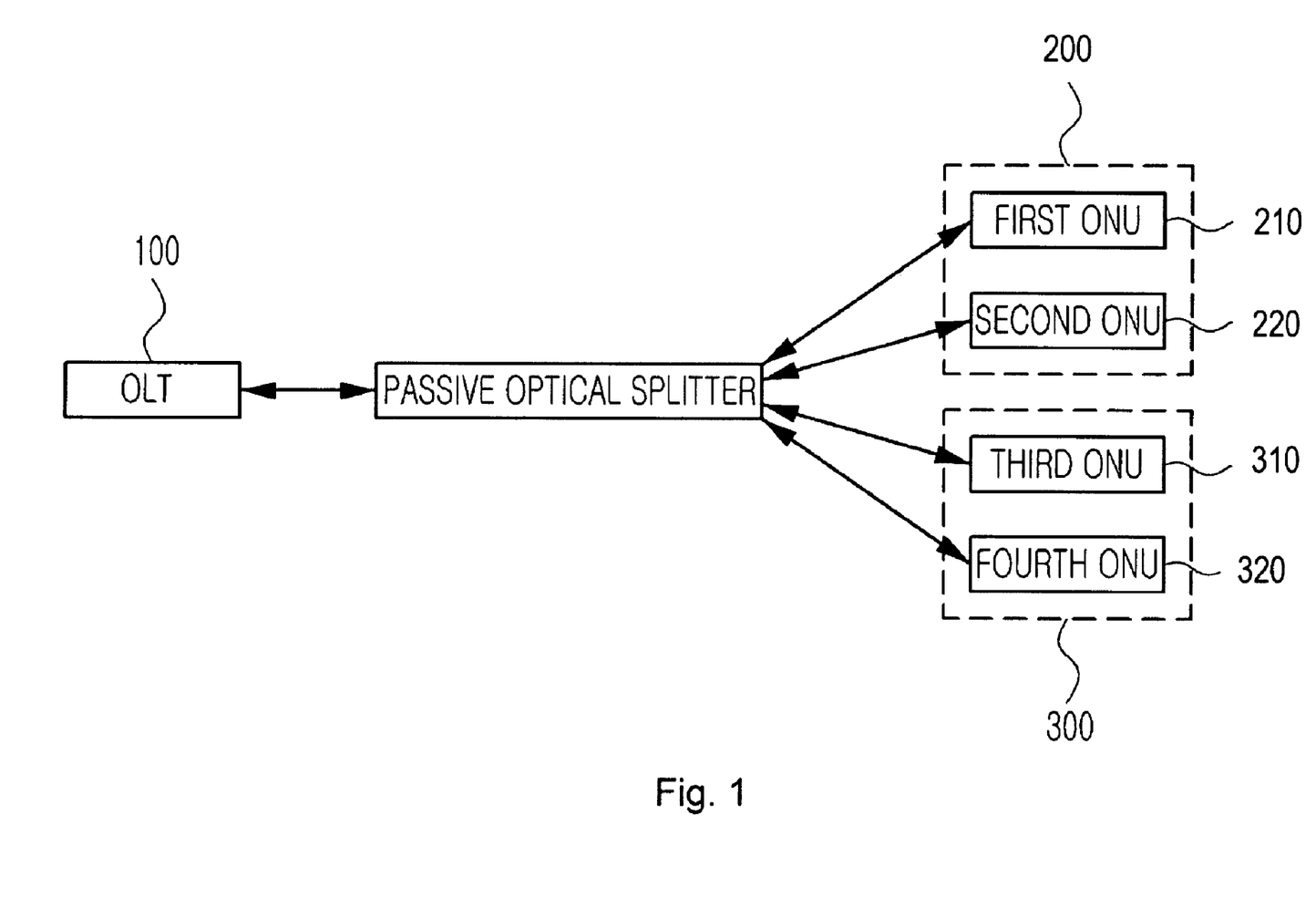
FIG. 1 is a block diagram illustrating the configuration of a polling system in an EPON according to an embodiment of the present invention.

FIG. 1 is a block diagram illustrating the configuration of a polling system in an EPON according to an embodiment of the present invention. As shown only as an example in FIG. 1, the polling system in the EPON includes multiple ONUs and an OLT 100. Herein, the multiple ONUs transmit traffic while sharing optical channels of the EPON with one another. The OLT 100 discriminates among a plurality of ONUs gaining access to the EPON from among the multiple ONUs included in the polling system, delivers REGISTER_REQUEST messages to the plurality of ONUs gaining access to the EPON, and then collects routing information on each ONU gaining access to the EPON through REGISTER_ACK (ACKnowledgement) messages answered by the plurality of ONUs gaining access to the EPON. Then, the OLT 100 classifies the plurality of ONUs gaining access to the EPON into two or more ONU groups according to the collected routing information (e.g., RTT information, an MAC address, etc.), and carries out not only an independent formation of a polling cycle, but also the allocation of bandwidth on each classified ONU group.

The OLT 100 desirably executes an independent bandwidth allocation to each ONU group every polling cycle by each ONU group based on an Interleaved Polling with Stop scheme.

To this end, the OLT 100 determines an upstream period of each ONU group through a 1-bit flag used for distinguishing a continuous upstream period by each ONU group, collects request bandwidth from ONUs of each ONU group, and then allocates bandwidth to each ONU group based on the collected request bandwidth.

The bandwidth allocation is performed by the OLT 100 in the concept that it is independent and parallel on an ONU group-by-ONU group basis. Accordingly, during a process of executing computation for bandwidth allocation to one ONU group, channel idle time regarding data upstream transmitted by the one ONU group occurs. By utilizing the channel idle time, data upstream is transmitted by another ONU group. The process as above is repeated.

Hereinafter, a more detailed description will be made on the premise that the plurality of ONUs gaining access to the EPON are the first ONU 210, the second ONU 220, the third ONU 310 and the fourth ONU 320, and that the first ONU 210 and the second ONU 220 belong to the first ONU group 200, and the third ONU 310 and the fourth ONU 320 belong to the second ONU group 300.

The OLT 100 performs processing, such as bandwidth allocation, based on the MPCP. As the first ONU 210 and the second ONU 220 specified as the first ONU group 200 sequentially transmit data upstream to the OLT 100, the relevant ONU piggybacks a REPORT message used for reporting a buffer size thereof to the OLT 100 for a transmission time slot. At this time, a time interval for which the first ONU 210 and the second ONU 220 specified as the first ONU group 200 transmit data upstream is preset by bandwidth allocated by the OLT 100 in a previous polling cycle.

To this end, upon receiving a REPORT message from each of the first ONU 210 and the second ONU 220 specified as the first ONU group 200, the OLT 100 allocates bandwidth in response to the received REPORT messages. For computation time necessary to allocate bandwidth, the first ONU group 200 not only enters a state where it cannot transmit data upstream, but the OLT 100 also enters a state where it cannot transmit a GATE message formed for the bandwidth allocation to the first ONU 200.

In a state as above where a channel idle period occurs in the first ONU group 200, based on a GATE message transmitted to the second ONU group 300 in the previous polling cycle, the second ONU group 300 begins to transmit data upstream at a time point the second ONU 220 corresponding to the last ONU of the first ONU group 200 completes the transmission of data upstream.

Repetitively, after processing for allocating bandwidth to the first ONU group 200 is completed in accordance with a time point the second ONU group 300 completes the transmission of data upstream, the OLT 100 transmits a GATE message regarding the bandwidth allocated to the first ONU group 200 to each of the first ONU 210 and the second ONU 220 specified as the first ONU group 200 in accordance with the time point the second ONU group 300 completes the transmission of data upstream.

A polling mechanism which repeats the process as above can reduce an idle time of optical channels, can alleviate a bottleneck situation between a backbone network and a large-capacity LAN, and solves such a problem as an optical channel idle state in the Interleaved Polling with Stop scheme. In addition, the polling mechanism can settle such problems as a low availability ratio of channels caused by high-traffic load as in the EA scheme and a reversed polling order among ONUs, and carries out the operation of bandwidth allocation on each ONU group, thereby reducing computation time necessary to allocate bandwidth.

Figure 2:
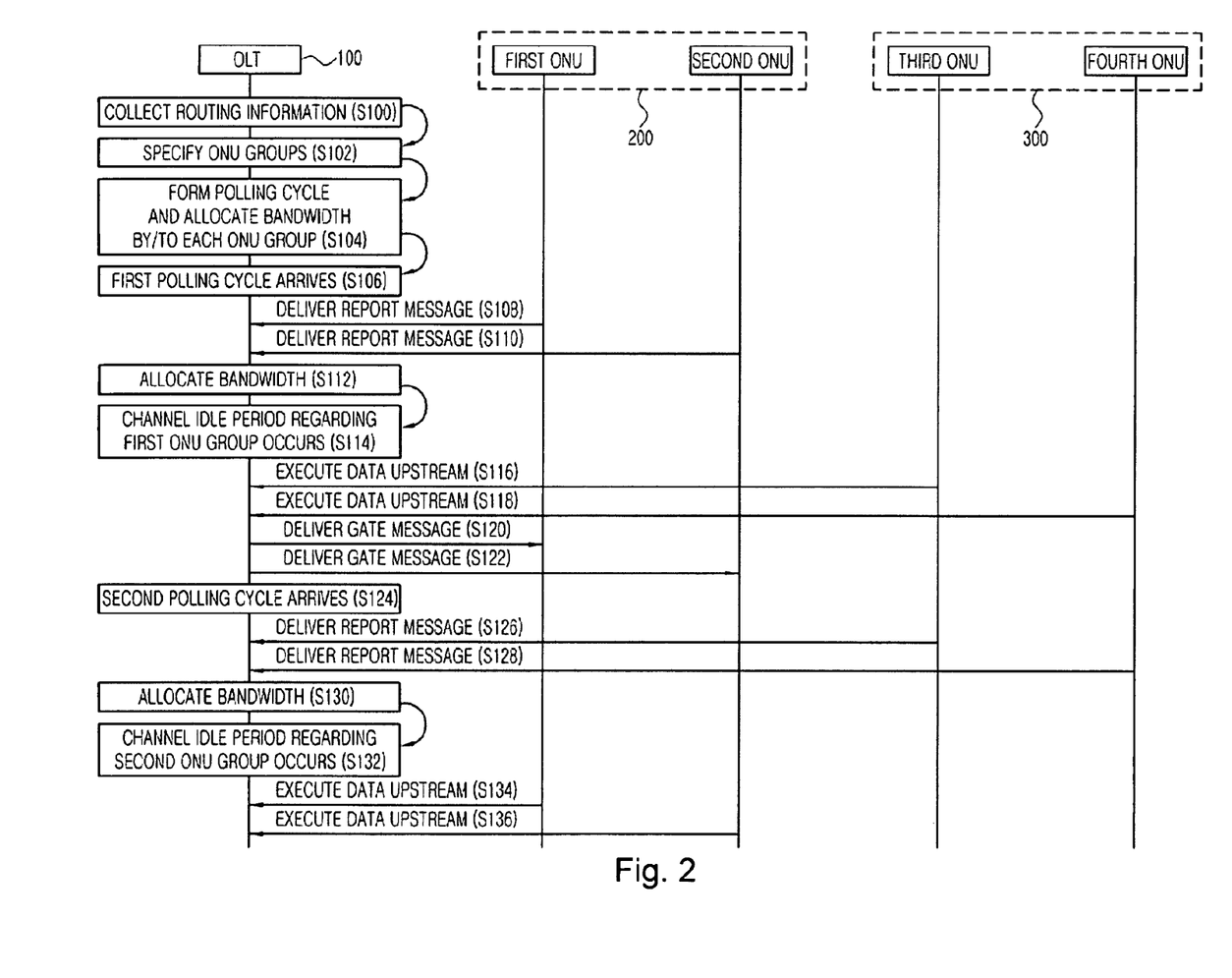
FIG. 2 is a flowchart illustrating an operation process of the polling system in the EPON depicted in FIG. 1.

FIG. 2 is a flowchart illustrating an operation process of the polling system in the EPON depicted in FIG. 1. As shown only as an example in FIG. 2, in a polling method performed by the polling system in the EPON, the OLT 100 checks if it gains access to the first ONU 210 and the second ONU 220, collects routing information, and then specifies a first ONU group 200 and a second ONU group 300 (S100 and S102).

Thereafter, the OLT 100 forms a first polling cycle for the first ONU group 200, and allocates bandwidth to the first ONU group 200. Also, the OLT 100 forms a second polling cycle for the second ONU group 300, and allocates bandwidth to the second ONU group 300. When the first polling cycle arrives, upon receiving each REPORT message from the first ONU group 200, the OLT 100 re-allocates bandwidth. For computation time necessary for the bandwidth re-allocation, a channel idle period regarding the first ONU group 200 occurs (S104 and S114).

During the channel idle period regarding the first ONU group 200, the third ONU 310 and the fourth ONU 320 of the second ONU group 300 transmit data upstream to the OLT 100 (S116 and S118).

In step S118, at a time point the fourth ONU 320 completes the transmission of data upstream, the OLT 100 delivers GATE messages set for the first ONU group 200 to the first ONU 210 and the second ONU 220 of the first ONU group 200, respectively (S120 and S122).

Then, when the second polling cycle arrives, upon receiving REPORT messages of the third ONU 310 and the fourth ONU 320 delivered by the second ONU group 300, the OLT 100 allocates bandwidth to the second ONU group 300 (S124 to S130).

For a computation time necessary for the bandwidth allocation to the second ONU group 300, a channel idle period regarding the second ONU group 300 occurs (S132). During the channel idle period regarding the second ONU group 300, the first ONU 210 and the second ONU 220 of the first ONU group 200 transmit data upstream to the OLT 100 (S134 and S136).

Figure 3:
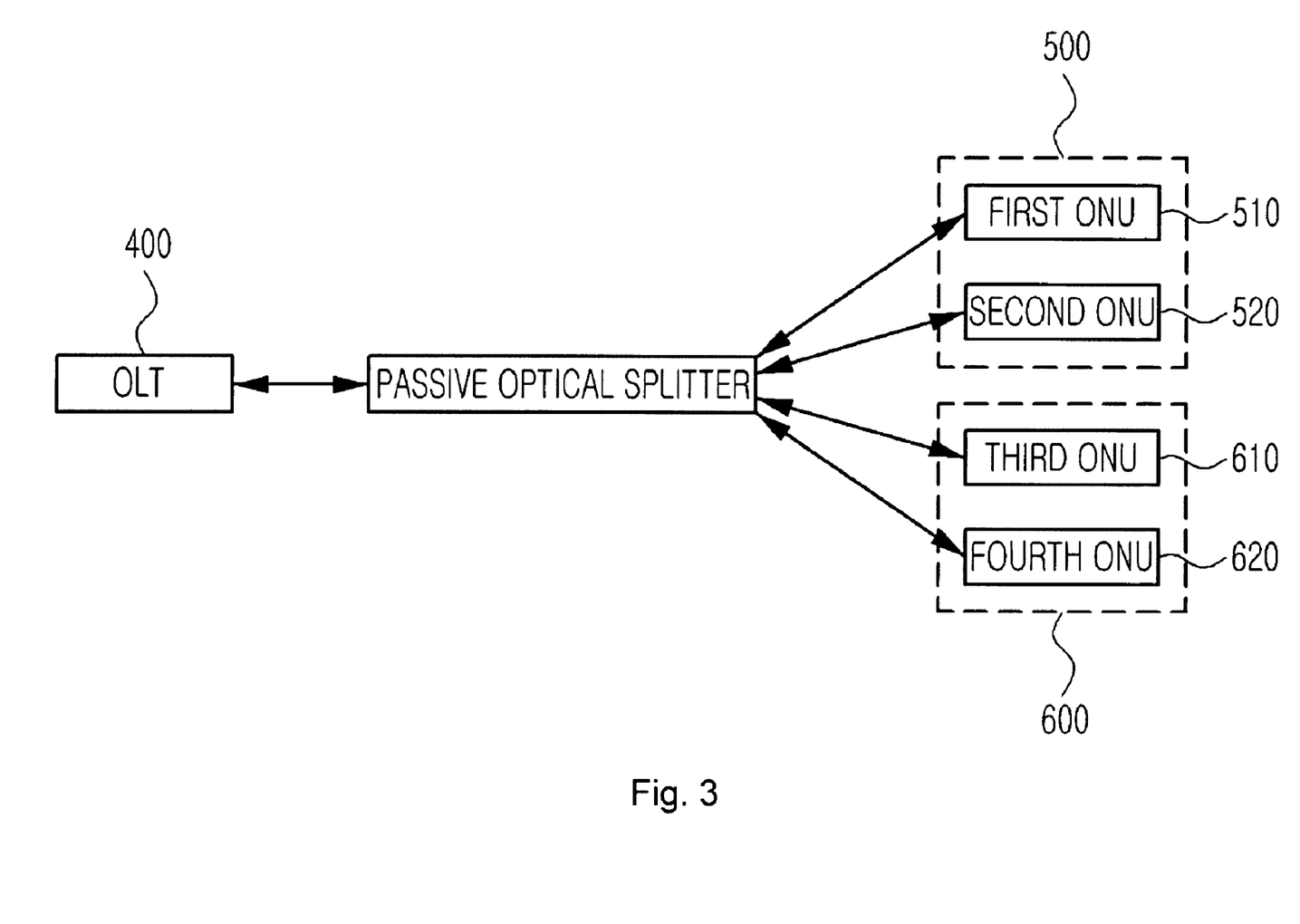
FIG. 3 is a block diagram illustrating the configuration of a polling system in an EPON according to another embodiment of the present invention.

FIG. 3 is a block diagram illustrating the configuration of a polling system in an EPON according to another embodiment of the present invention. As shown only as an example in FIG. 3, the polling system in the EPON includes the first to the fourth ONUs 510, 520, 610 and 620, and an OLT 400. Herein, the first to the fourth ONUs 510, 520, 610, and 620 transmit traffic while sharing optical channels of the EPON with one another. The OLT 400 collects routing information on the first to fourth ONUs 510, 520, 610, and 620. If the level of traffic load of the EPON is equal to or lower than a predetermined level based on the collected routing information, the OLT 400 performs a first polling mechanism for allocating bandwidth to each of the first to the fourth ONUs 510, 520, 610, and 620. If the level of traffic load of the EPON is higher than the predetermined level based on the collected routing information, the OLT 400 classifies the first to the fourth ONUs 510, 520, 610, and 620 into the first ONU group 500 and the second ONU group 600, and then performs the second polling mechanism for forming the polling cycle and allocating bandwidth on each ONU group.

The OLT 400 is desirably equipped with a 1-bit cross-flag for crossing the first polling mechanism and the second polling mechanism, i.e., for distinguishing two polling mechanisms.

Thereafter, the OLT 400 performs the cross-execution of the two polling mechanisms and the like based on the MPCP. At this time, the OLT 400 executes the first polling mechanism or the second polling mechanism based on a polling switching threshold value set by $$S_{tran} = \frac{T_{idle} \times R_U}{8 \text{ bits}},$$

wherein $S_{tran}$ represents a polling switching threshold value, $T_{idle}$ represents idle time of an optical channel (computation time necessary to allocate bandwidth to a plurality of ONUs gaining access to the EPON+an RTT), and $R_U$ represents an upstream channel speed in bits/sec. If a polling switching threshold value is set to the value equal to or smaller than a predetermined value, and then the level of traffic in a network is determined to be low, the first polling mechanism is executed. On the contrary, if a polling switching threshold value is greater than the predetermined value, the level of traffic in a network is determined to be high, and accordingly, the second polling mechanism is executed.

Thereafter, the OLT 400 executes the first polling mechanism, and allocates bandwidth to each of the first to the fourth ONUs 510, 520, 610, and 620. Then, if a condition as defined by $$\sum_{i \in A} R'_i \geq S_{tran}, \sum_{j \in B} R'_j \geq S_{tran}, \sum_{i \in A} R_i \geq S_{tran}, \text{ and } \sum_{j \in B} R_j \geq S_{tran},$$

is satisfied the OLT 400 switches the first polling mechanism to the second polling mechanism, wherein $R_i$ represents a requested bandwidth for the first ONU 510, $R'_i$ represents a requested bandwidth for the first ONU 510 in a previous polling cycle, $R_j$ represents a requested bandwidth for the second ONU 520, $R'_j$ represents a requested bandwidth for the second ONU 520 in a previous polling cycle, A represents the first ONU group 500, and B represents the second ONU group 600.

Meanwhile, the OLT 400 executes the second polling mechanism, and carries out forming a polling cycle and allocating bandwidth on each of the first ONU group 500 and the second ONU group 600. Then, if a condition as defined by $$\sum_{i \in A} R'_i < S_{tran}, \sum_{j \in B} R'_j < S_{tran}, \sum_{i \in A} R_i < S_{tran}, \text{ and } \sum_{j \in B} R_j < S_{tran},$$

is satisfied, the OLT 400 switches the second polling mechanism to the first polling mechanism, wherein $R_i$ represents a requested bandwidth for the first ONU 510, $R'_i$ represents a requested bandwidth for the first ONU 510 in a previous polling cycle, $R_j$ represents a requested bandwidth for the second ONU 520, $R'_j$ represents a requested bandwidth for the second ONU 520 in a previous polling cycle, A represents the first ONU group 500, and B represents the second ONU group 600.

Herein, the first polling mechanism desirably corresponds to the Interleaved Polling scheme, and the second polling mechanism desirably corresponds to a polling scheme as illustrated in FIGS. 1 and 2 based on the Interleaved Polling with Stop scheme.

Figure 4:
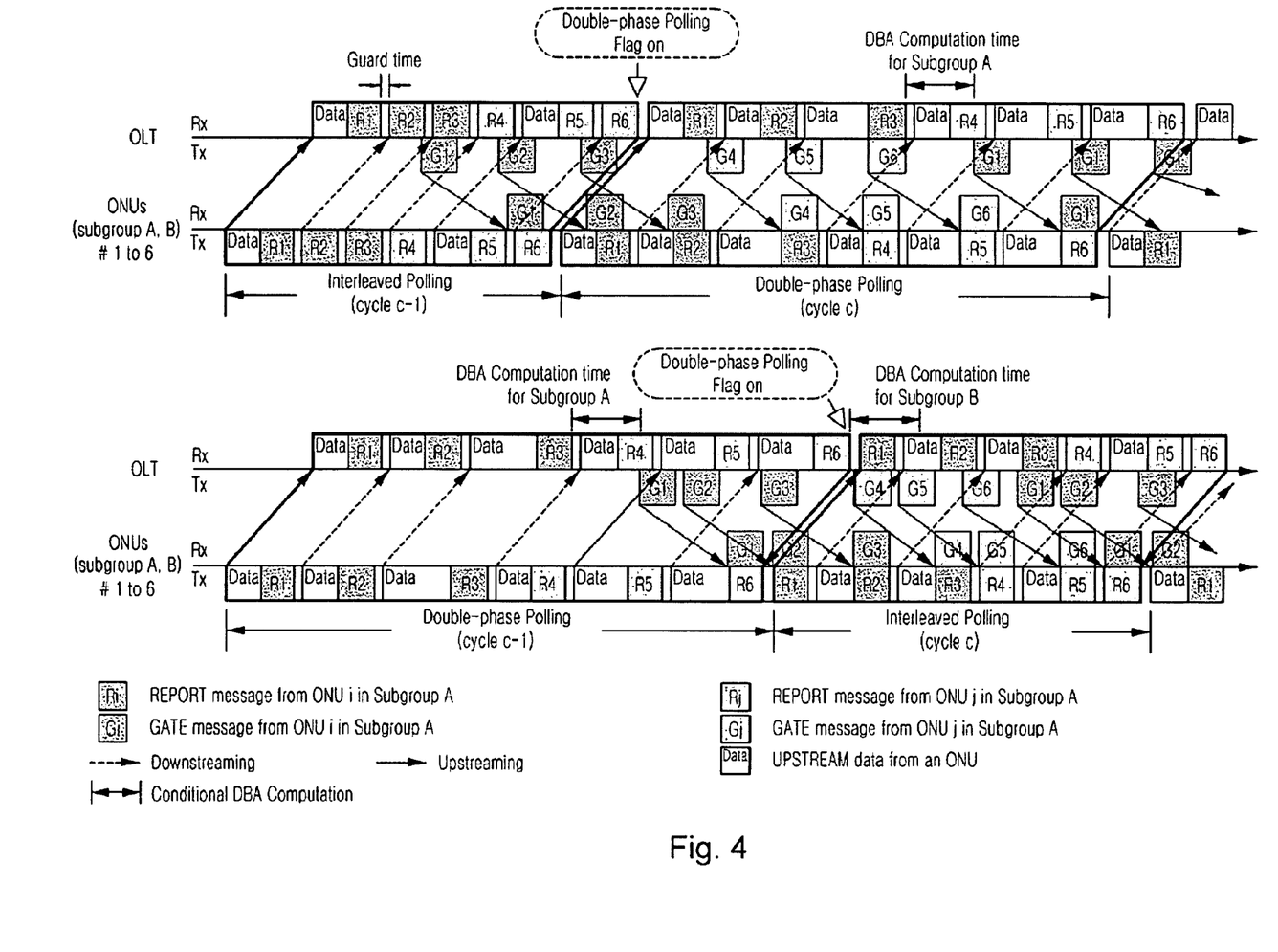
FIG. 4 is a view showing the process of switching between polling mechanisms by the polling system in the EPON depicted in FIG. 3.

In addition, FIG. 4 illustrates the process of switching between the polling mechanisms as described above as an example.

Figure 5:
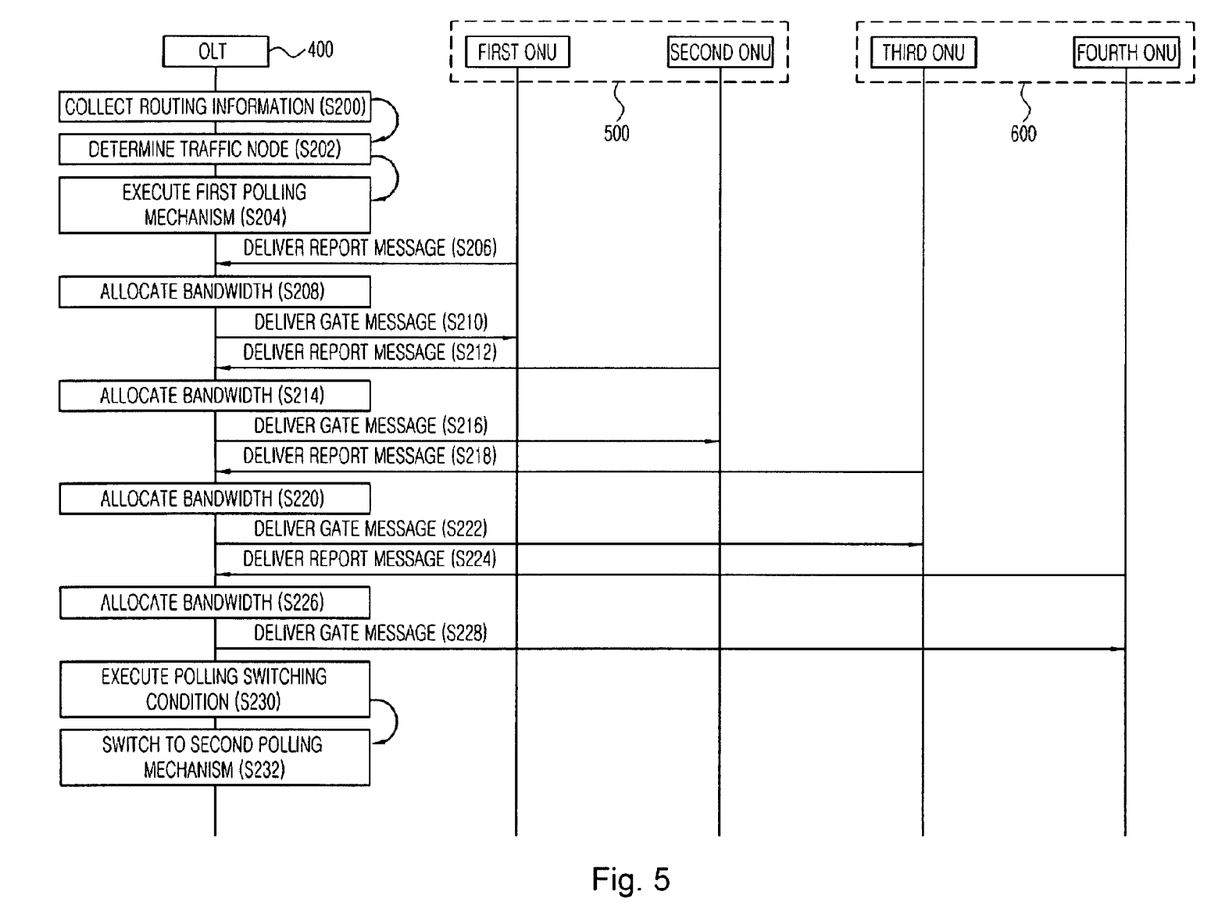
FIG. 5 is a flowchart illustrating an operation process of the polling system in the EPON depicted in FIG. 3.

FIG. 5 is a flowchart illustrating an operation process of the polling system in the EPON depicted in FIG. 3. As shown only as an example in FIG. 5, in a polling method performed by the polling system in the EPON, the OLT 400 collects routing information from the first to the fourth ONUs 510, 520, 610, and 620, and determines traffic load of the EPON based on the collected routing information (S200 and S202).

Thereafter, if the level of traffic in the network is determined to be equal to or lower than a predetermined level, the OLT 400 executes the first polling mechanism, and allocates bandwidth to each of the first to the fourth ONUs 510, 520, 610, and 620 (8204 to S228).

The OLT 400 allocates bandwidth to the fourth ONU 620, and delivers a GATE message to the fourth ONU 620. Then, the OLT 400 determines if the bandwidth allocation to the fourth ONU 620 satisfies a polling switching condition necessary for switching the first polling mechanism corresponding to the Interleaved Polling scheme to the second polling mechanism based on the Interleaved Polling with Stop scheme (S230).

If it is determined in step S230 that the bandwidth allocation to the fourth ONU 620 satisfies the polling switching condition, the OLT 400 switches the first polling mechanism to the second polling mechanism (S232).

The merits and effects of exemplary embodiments, as disclosed in the present invention, and as so configured to operate above, will be described below.

In the present invention as described above, a polling system in an EPON is implemented, in which multiple ONUs gaining access to the EPON are classified into at least two ONU groups, and then, forming a polling cycle and allocating bandwidth are carried out independently and parallel on each ONU group. Also, a polling system for cross-executing at least two polling mechanisms, corresponding to traffic load in the EPON, is realized. Accordingly, by minimizing an upstream channel idle period caused by the Interleaved Polling with Stop scheme and the EA scheme, an availability ratio of traffic channels can be raised.

Also, based on the Interleaved Polling with Stop scheme, multiple ONUs gaining access to the EPON are classified into two or more ONU groups, and then bandwidth allocation, etc., are performed to each ONU group. Accordingly, processing overhead caused by computation for allocating bandwidth can not only be significantly diminished, but the existing infrastructure of the EPON which has already been possessed is also accepted as it stands, so that installation costs are also highly cheap.

In addition, depending on the level of traffic load in the EPON, which changes every moment, the existing Interleaved Polling scheme or the polling scheme according to the present invention evolved from the Interleaved Polling with Stop scheme can be selectively executed. Consequently, data transmission service can be dynamically provided.

Further, the present invention has the merits that the maximization of traffic channel usage results from efficient utilization of resources, including traffic channels and time slots, used for traffic transmission in an EPON-based system. As a result, the possibility of marketing or sales of the system and the method according to the present invention is not only large enough, but the system and the method have also the extent to which a realistic application thereof is obvious. Hence, the system and the method are worthy to have high industrial applicability.

While the invention has been shown and described with reference to exemplary embodiments thereof, it will be understood by those skilled in the art that various changes in form and details may be made therein without departing from the spirit and scope of the invention. Therefore, the spirit and scope of the present invention must be defined not by described embodiments thereof but by the appended claims and equivalents of the appended claims.

What is claimed:

1. An apparatus for polling in an Ethernet Passive Optical Network (EPON) including multiple Optical Network Units (ONUs) sharing optical channels of the EPON with one another and transmitting traffic, the apparatus comprising:
   an Optical Line Terminal (OLT) to discriminate among a plurality of ONUs gaining access to the EPON among the multiple ONUs, collect routing information on the plurality of ONUs gaining access to the EPON, classify the plurality of ONUs gaining access to the EPON into two or more ONU groups according to the collected routing information, and carry out forming a polling cycle and allocating bandwidth on each ONU group, wherein the OLT
   forms the first polling cycle, corresponding to the first ONU group among the two or more ONU groups, forms the second polling cycle, corresponding to the second ONU group among the two or more ONU groups, receives the REPORT messages representing buffer sizes from the ONUs in the first ONU group every first polling cycle, and forms a GATE messages regarding the allocation of bandwidth corresponding to the buffer size to deliver the formed GATE messages to the ONUs in the first ONU group, and
   receives REPORT messages representing a buffer size from ONUs in the second ONU group every second polling cycle, and forms GATE messages regarding the allocation of bandwidth corresponding to the buffer size to deliver the formed GATE messages to the ONUs in the second ONU group.

2. The apparatus as claimed in claim 1, wherein the OLT is based on a Multi-Point Control Protocol (MPCP).

3. The apparatus as claimed in claim 2, wherein the OLT forms the two or more ONU groups through a result produced by determining the routing information based on the MPCP.

4. The apparatus as claimed in claim 3, wherein the OLT re-discriminates a plurality of ONUs gaining access to the EPON among the multiple ONUs and re-collects routing information on the plurality of ONUs gaining access to the EPON, and re-forms two or more ONU groups based on the re-collected routing information.

5. The apparatus as claimed in claim 3, wherein the routing information comprises: Round Trip Time (RTT) information; and a Media Access Control (MAC) address.

6. The apparatus as claimed in claim 1, wherein the OLT:
   forms the first polling cycle regarding the first ONU group with the Interleaved Polling with Stop scheme, and allocates bandwidth with GATE messages; and
   forms the second polling cycle regarding the second ONU group in the Interleaved Polling with Stop scheme, and allocates bandwidth with GATE messages.

7. The apparatus as claimed in claim 1, wherein the OLT allows ONUs in the second ONU group to transmit traffic while forming the GATE messages for the first ONU group, the OLT allows ONUs in the first ONU group to transmit traffic while forming the GATE messages for the second ONU group.

8. The apparatus as claimed in claim 1, wherein the traffic corresponds to upstream traffic transmitted by the plurality of ONUs gaining access to the EPON.

9. A method for polling in an Ethernet Passive Optical Network (EPON), the method comprising:
   discriminating, by an Optical Line Terminal (OLT), a plurality of Optical Network Units (ONUs) gaining access to the EPON among multiple ONUs for sharing optical channels of the EPON with one another and transmitting traffic;
   collecting, by the OLT, routing information from the plurality of ONUs gaining access to the EPON;
   classifying, by the OLT, the plurality of ONUs gaining access to the EPON into two or more ONU groups; and
   carrying out, by the OLT, forming a polling cycle and allocating bandwidth on each ONU group, wherein the forming a polling cycle and allocating bandwidth on each ONU group includes
   forming a first polling cycle corresponding to a first ONU group among the two or more ONU groups, and forming a second polling cycle corresponding to a second ONU group among the two or more ONU groups;

receiving REPORT messages representing a buffer size from the ONUs in the first ONU group every first polling cycle;

forming GATE messages regarding the allocation of bandwidth corresponding to the REPORT messages, and delivering the formed the GATE messages to the ONUs in the first ONU group;

receiving REPORT messages representing a buffer size from the ONUs in the second ONU group every second polling cycle; and forming GATE messages regarding the allocation of bandwidth corresponding to the REPORT messages, and delivering the formed GATE messages to the ONUs in the second ONU group.

10. The method as claimed in claim 9, which further Comprises re-discriminating a plurality of ONUs gaining access to the EPON among the multiple ONUs to re-collect routing information on the plurality of ONUs gaining access to the EPON, re-forming two or more ONU groups based on the re-collected routing information, and carrying out forming a polling cycle and allocating bandwidth on each ONU group.

11. The method as claimed in claim 9, wherein the forming a polling cycle and allocating bandwidth on each ONU group further includes allowing the ONUs in the second ONU group to transmit traffic while forming GATE messages for the first ONU group, and allowing the ONUs in the first ONU group to transmit traffic while forming GATE messages for the second ONU group.

12. An apparatus for polling in an Ethernet Passive Optical Network (EPON) including multiple Optical Network Units (ONUs) for sharing optical channels of the EPON with one another and transmitting traffic, the apparatus comprising:

an Optical Line Terminal (OLT) to discriminate among a plurality of ONUs gaining access to the EPON among the multiple ONUs, collect routing information on the plurality of ONUs gaining access to the EPON, execute, depending on traffic load of the EPON based on the collected routing information, a first polling mechanism for allocating bandwidth to each ONU included in the plurality of ONUs gaining access to the EPON, or a second polling mechanism for carrying out forming a polling cycle and allocating bandwidth on each ONU group after classifying the plurality of ONUs gaining access to the EPON into two or more ONU groups according to the collected routing information, wherein the OLT determines traffic load of the EPON based on a polling switching threshold value set by $$S_{tran} = \frac{T_{idle} \times R_U}{8 \text{ bits}},$$

and cross-executes the first polling mechanism and the second polling mechanism, wherein $S_{tran}$ represents a polling switching threshold value, $T_{idle}$ represents idle time of an optical channel (computation time necessary to allocate bandwidth to a plurality of ONUs gaining access to the EPON+an RTT), and $R_u$ represents an upstream channel speed in bits/sec.

13. The apparatus as claimed in claim 12, wherein the OLT is based on a Multi-Point Control Protocol (MPCP).

14. The apparatus as claimed in claim 12, wherein the OLT executes the first polling mechanism to allocate bandwidth to the plurality of ONUs gaining access to the EPON, and switches the first polling mechanism to the second polling mechanism depending on whether the bandwidth allocation executed by the first polling mechanism satisfies a condition defined by $$\sum_{i \in A} R'_i \geq S_{tran}, \sum_{j \in B} R'_j \geq S_{tran}, \sum_{i \in A} R_i \geq S_{tran}, \text{ and } \sum_{j \in B} R_j \geq S_{tran},$$

wherein $R_i$ represents requested bandwidth of ONU_i in the first ONU group, $R'_i$ represents requested bandwidth of ONU_i in the first ONU group in a previous polling cycle, $R_j$ represents requested bandwidth of ONU_i in the second ONU group, $R'_j$ represents requested bandwidth of ONU_i in the second ONU group in a previous polling cycle, A represents the first ONU group, and B represents the second ONU group.

15. The apparatus as claimed in claim 12 wherein the OLT executes the second polling mechanism to form a polling cycle and allocate bandwidth on each group, and switches the second polling mechanism to the first polling mechanism depending on whether the formation of the polling cycle and the bandwidth allocation executed by the second polling mechanism satisfies a condition defined by $$\sum_{i \in A} R'_i < S_{tran}, \sum_{j \in B} R'_j < S_{tran}, \sum_{i \in A} R_i < S_{tran}, \text{ and } \sum_{j \in B} R_j < S_{tran},$$

wherein $R_i$ represents requested bandwidth of ONU_i in the first ONU group, $R'_i$ represents requested bandwidth of ONU_i in the first ONU group in a previous polling cycle, $R_j$ represents requested bandwidth of ONU_i in the second ONU group, $R'_j$ represents requested bandwidth of ONU_i in the second ONU group in a previous polling cycle, A represents the first ONU group, and B represents the second ONU group.

16. The apparatus as claimed in claim 12, wherein the first polling mechanism corresponds to the Interleaved Polling scheme.

17. The apparatus as claimed in claim 12, wherein the second polling mechanism is based on the Interleaved Polling with Stop scheme.

18. A method for polling in an Ethernet Passive Optical Network (EPON), the method comprising:

discriminating, by an Optical Line Terminal (OLT), a plurality of Optical Network Units (ONUs) gaining access to the EPON among multiple ONUs for sharing optical channels of the EPON with one another and transmitting traffic;

collecting, by the OLT, routing information from the plurality of ONUs gaining access to the EPON;

determining, by the OLT, traffic load of the EPON based on the routing information; and executing, by the OLT, depending on a polling switching threshold value set for the determined traffic load of the EPON, a first polling mechanism for allocating bandwidth to each ONU included in the plurality of ONUs gaining access to the EPON, a second polling mechanism for forming a polling cycle and allocating bandwidth on each ONU group after classifying the plurality of ONUs gaining access to the EPON into two or more ONU groups according to the collected routing information.

19. The method as claimed in claim 18, further comprising:
re-discriminating a plurality of ONUs gaining access to the EPON among the multiple ONUs, re-collecting routing information on the plurality of ONUs gaining access to the EPON, and re-determining traffic load of the EPON based on the re-collected routing information; and
cross-executing the first polling mechanism and the second polling mechanism depending on a polling switching threshold value set for the re-determined traffic load of the EPON.

20. The method as claimed in claim 18, wherein the first polling mechanism corresponds to an Interleaved Polling scheme.

21. The method as claimed in claim 18, wherein the second polling mechanism is based on an Interleaved Polling with Stop scheme.

* * * * *